United States Patent [19]

Jacobs et al.

[11] 3,973,840

[45] Aug. 10, 1976

[54] MANNEQUIN

[75] Inventors: G. Richard Jacobs, Salt Lake City; Cluff Peck, Kearns; Dean G. Soderquist, Salt Lake City, all of Utah

[73] Assignee: Corporation of the President of The Church of Jesus Christ of Latter-Day Saints, Salt Lake City, Utah

[22] Filed: Sept. 3, 1974

[21] Appl. No.: 502,805

[52] U.S. Cl. ............................... 352/86; 352/43; 353/10; 353/28; 272/10
[51] Int. Cl.² ................................. G03B 21/32
[58] Field of Search ............... 352/43, 85, 86, 47, 352/89; 353/10, 28; 272/10

[56] References Cited
UNITED STATES PATENTS

| | | | |
|---|---|---|---|
| 1,653,180 | 12/1927 | Jalpert | 272/10 |
| 1,898,905 | 2/1933 | Seitz | 352/47 |
| 3,053,144 | 9/1962 | Harries et al. | 352/86 |
| 3,634,004 | 1/1972 | Howard | 352/89 |

OTHER PUBLICATIONS
"Shop Talk," by Norman Goldberg, *Popular Photography* June, 1972, pp. 62–64.

*Primary Examiner*—Russell E. Adams, Jr.
*Attorney, Agent, or Firm*—George H. Mortimer

[57] ABSTRACT

A mannequin comprising a head part and a torso part adjustably joined together. In the torso part a sound moving picture projector is mounted to project facial images on a film in a light beam upwardly through the neck into the head as the film is moved through the projector. Simultaneously sound from a track on the film is picked up, amplified and audibly reproduced. The sound and facial images are correlated to simulate a speaking person. The head part has a face piece with well defined forehead, nose, cheeks and chin but only smooth areas for eyes and mouth which is molded of transparent plastic and surface coated as a rear projection screen. Means in the head receive the light beam from the projector and transmit onto the rear projection screen so that the projected facial features correspond in location to the facial features on the face piece. An electrical circuit supplies current of proper voltage to a motor to operate the movable parts of the projector, to a lamp to supply the light beam and to an amplifier for the sound reproduction means. The film is preferably endless in a removable cassette that automatically rewinds after it passes through the film gate and sound pick up means. A remote switch may be provided to start the projector and automatic means may stop it at the end of the message.

17 Claims, 5 Drawing Figures

MANNEQUIN

INTRODUCTION

The present invention relates to a mannequin, particularly an animated speaking mannequin that closely simulates a live person's facial movements and expressions while delivering a vocal message. It is particularly adapted for use in a three dimension scene depicting a notable event in which some person played an important role portrayed by the mannequin. Such scenes may be displayed in museums, exhibits, exhibitions, large stores and the like. Frequently, a switch is provided for a viewer who wishes to see and hear the mannequin. Closing the switch may start the animation of the face and reproduction of the message and the mechanism may run automatically to the end of the message when it stops in readiness to repeat the performance each time the switch is closed.

BACKGROUND OF THE INVENTION

Ideas are communicated from one person to another largely through the senses of hearing and sight. In general intelligence which is seen is remembered better than something that is only heard and a picture is usually able to convey more information that lends itself to illustration in a shorter time than a printed description. For these reasons it has been common in museums, exhibits, exhibitions, stores and the like to provide pictures and displays to teach people about life styles of humans and animals, historic events, interior decorating, and the like. Three dimensional displays, particularly with life-like figures and environments, get more attention from people visiting a museum, exhibit, store or the like than a painting or picture of the same scene. Motion pictures approach displays in effectiveness in getting attention and in conveying information.

Many proposals have been made heretofore to animate dolls, wax figures, mannequins and the like in displays. These proposals have included means to impart movement to the figure and in Jalbert U.S. Pat. No. 1,653,180 it has been proposed to project an animated countenance on a smooth and slightly convex surface representing the face of a lay figure, either externally or interiorly by the use of two mirrors.

The present invention provides a mannequin that delivers a vocal message apparently coming from its mouth while simulating facial movements coordinated with the message.

DESCRIPTION OF THE INVENTION

The invention will be described in conjunction with the drawing in which.

Figure 1:
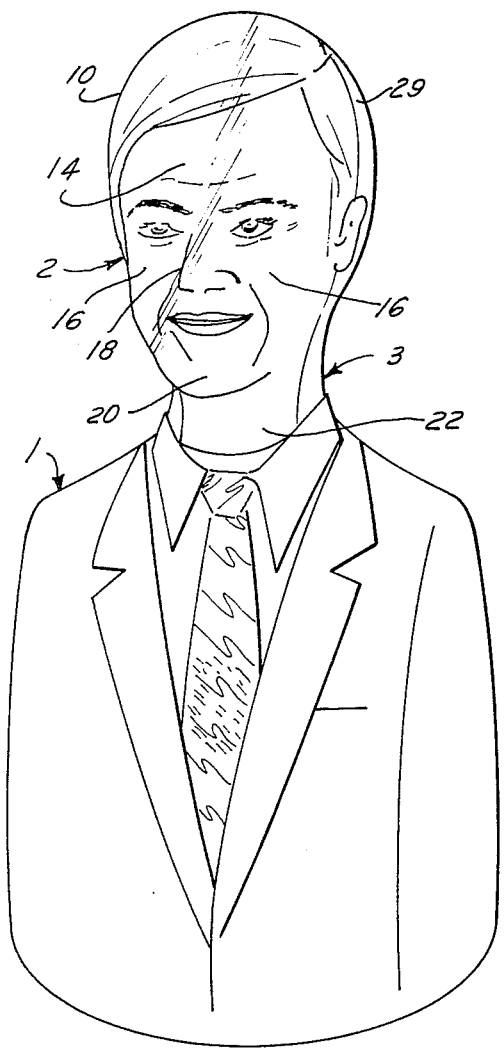
FIG. 1 is a fragmentary exterior perspective view showing the torso and head of a mannequin with the face as it appears when facial movements are projected on it in accordance with the invention.
Figure 2:
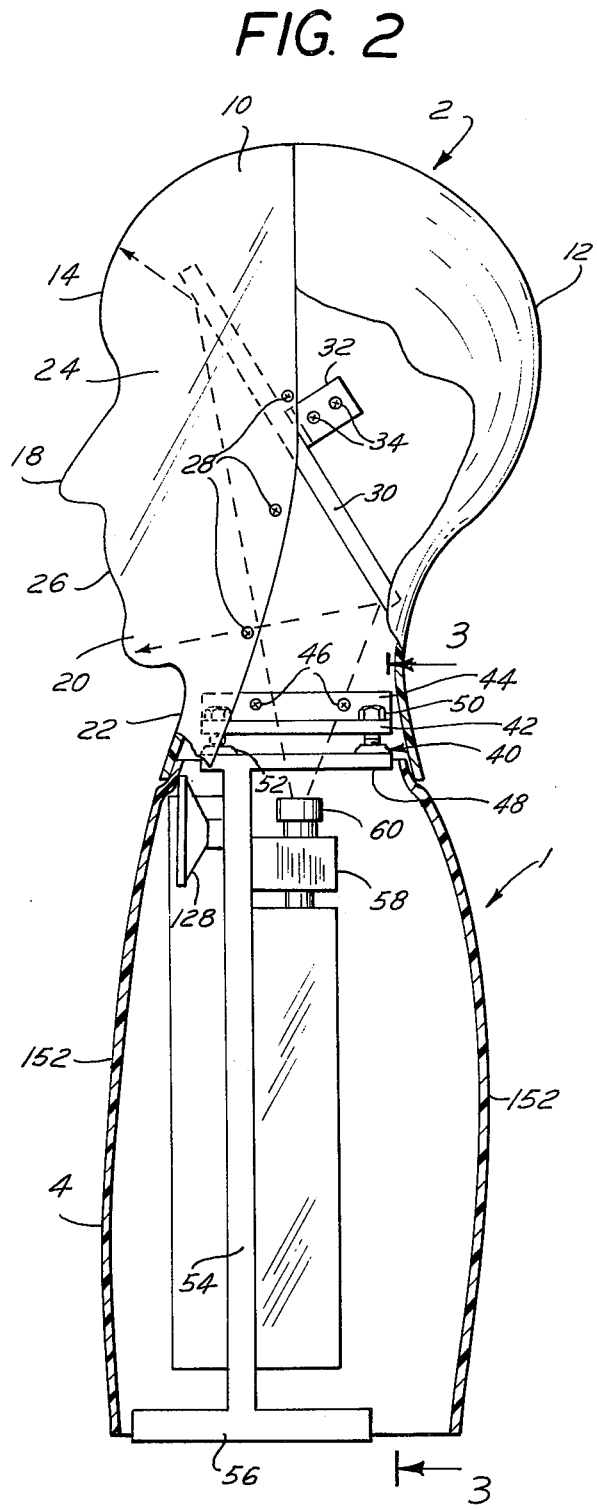
FIG. 2 is a side view, partly in vertical section, of the fragmentary mannequin of FIG. 2 showing schematically the mounting of projection means for sight and sound therein.

Referring now more particularly to FIGS. 1 and 2, the mannequin 1 comprises a head 2, a neck 3 and a torso 4. Preferably the mannequin would be provided with legs to complete the simulation of a human figure but since the invention relates to the parts of the figure shown in the drawings, other parts are not illustrated.

The head 2 and the neck 3 are preferably made as one part and the torso 4 as a separate part which may be adjustably secured together as and for the reasons stated hereinafter.

The head 2 and neck 3 comprise a visage or face piece 10 and a back or frame piece 12.

The face piece 10 has a well defined forehead 14, cheeks 16, nose 18, chin 20 and the front part of a neck 22 but poorly defined eye areas 24 and lip area 26. "Poorly defined" in this context means that no details of eyes and mouth such as eye brows, eye lids, eyeballs, lips, teeth and the like are formed in the visage. Instead the eye and lip areas are contoured more or less smoothly into the general contour of the face piece which is hollow and extends back approximately to a plane passing downwardly through the head and neck about half way from the forehead to the crown and in front of the ears.

The face piece 10 is preferably made from a sheet of clear thermoplastic synthetic resin vacuum molded to the contour described and illustrated. Any suitable synthetic resin may be used for the face piece, e.g., an acrylic resin. After forming the visage in the resin sheet it is coated exteriorly with a material of the type used on rear projection screens. Such coated face pieces preferably have a matte surface neutral gray in color in preference to a matte white reflective surface because it provides excellent images for both color and black and white film when it serves as a rear view projection screen for facial expressions.

The back or frame piece 12 is of a size and shape to complete the skull and neck of the head 2 and extend under the edge of the face piece 10 far enough to be secured thereto by fasteners 28 of any desired kind, e.g., screws. It is hollow and may be made of any suitable material such as metal, plastic and the like. When assembled as shown the joint between the face and frame pieces can be made quite inconspicuous and a wig or other covering 29 of the appropriate area of the head may and usually will be provided.

Mounted in the frame piece 12 is a means 30 for receiving a beam of light through the neck and transmitting it to the visage 10. One satisfactory means comprises a mirror secured in any suitable way, e.g., by brackets 32 and suitable fasteners 34, to the frame. Preferably such a mirror is of the front coated type so as to minimize distortion of images in the light beam. Satisfactory results may be obtained with a mirror having a plane surface which gives about a 90° viewing angle, i.e., about 45° on each side of a median plane through the face piece. If a wider viewing angle is desired a mirror with a suitably curved face or a prisim system may be used in place of the plane mirror.

The means 40 for connecting the head 2 to the torso 4 preferably provides for centering and aligning the head properly with the torso so as to direct the beam of light coming from the torso accurately onto the visage 10. A suitable means 40 comprises (1) a bracket or plate 42 at each side secured in any suitable manner in the neck 3 of frame piece 12, e.g., by flanges 44 secured by rivets 46 to the respective sides of the neck adjacent to the lower end thereof as shown in FIG. 2, (2) complementary spaced plates 48 secured to the torso 4 as later described and (3) three or four, (two being shown) centering and aligning bolts 50. The bolts 50 pass through threaded holes in plate 42 into sockets 52 secured to plate 48 in which the ends of the bolts are rotatably held so that by turning the bolts selectively the head 2 can be tilted and held in any desired direction with respect to the torso.

Plates 48 are secured in the torso by means of a mounting frame 54 running vertically through the torso on a lateral plane somewhat forward of center and having a mounting bracket 56 at the bottom end for connection to any suitable support (not shown) for the torso, e.g, a pedestal, legs or the like.

Figure 3:
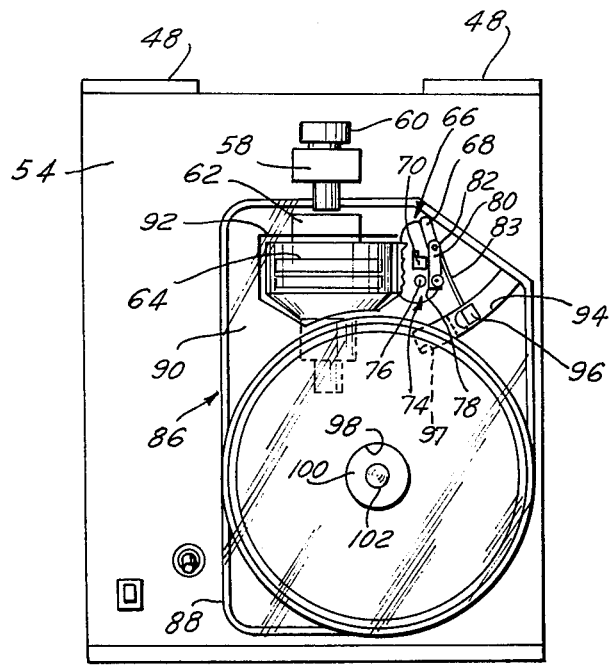
FIG. 3 is a fragmentary elevation of the rear side of the projection means in the torso of the mannequin as viewed from the line 3—3 of FIG. 2.
Figure 4:
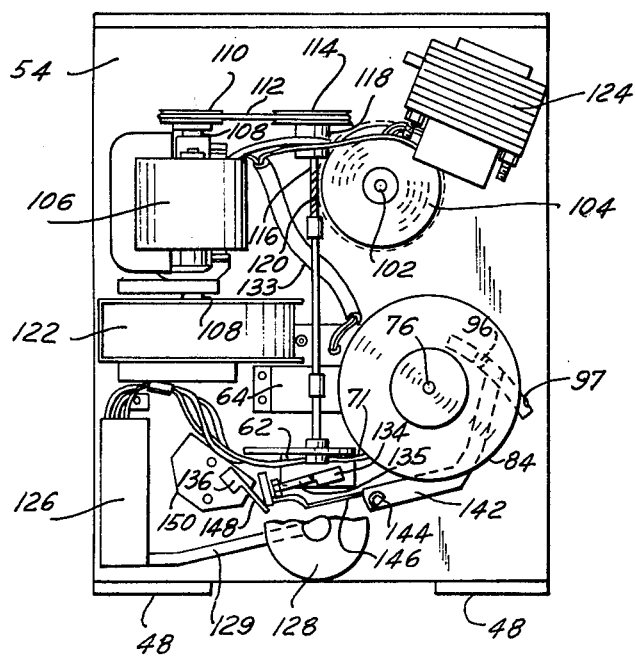
FIG. 4 is a fragmentary elevation of the other side of the projection means of FIG. 3 in inverted position.

Mounted on frame 54 is the projection means for sight and sound which is only schematically shown in FIG. 2, mounted on both the front and back sides of the frame. FIGS. 3 and 4 show in more detail the parts of the projection means. Mounted on the backside of frame 54 near the top and center thereof is a lens holder 58 in which a lens 60 is adjustably secured for the purpose of focusing images properly on the visage 10. As seen in FIG. 2 the lens 60 projects a light beam upwardly onto the mirror 30 between the plates 48 and brackets 42 and approximately centrally of the neck 3. Just below the lens 60, as seen in FIG. 3, is an intermittent unit 62, also mounted on frame 54, which includes suitable known means (not shown) for advancing a film through a film gate intermittently frame by frame, such as a claw to move the film a step at a time, a cam shaft to drive the claw, a shutter to interrupt the light beam when the film is moving past the gate, a shaft to drive the shutter and a frame adjusting lever, which may have any suitable known construction. The shafts are journaled in and go through the frame 54 to the front side to connect to the drive means described hereinafter in conjunction with FIG. 4. A lamp house 64 is removably mounted on the frame 54 just below the intermittent unit 62 to house a projection lamp (not shown in FIG. 3) for generating a beam of light that passes out of the upper end of the house 64, through a film in the film gate and through lens 60 to the mirror 30 where it is reflected onto the rear projection visage screen 10. No correction means is required between the projector and screen 10 because of the smooth, poorly defined areas for the eyes and mouth. When the eye and mouth details on the film are properly focused on these smooth areas, the whole face has the appearance of a living person without making any correction because of the three dimensional contour of the screen from a two dimensional film.

To the right of the intermittent unit 62, as seen in FIG. 3, a sound head unit 66 is mounted in frame 54 to pick up the sound that is recorded on the film soon after it leaves the film gate through which the image also recorded on the film is projected. Any suitable sound pick up means may be used. Generally a sound pick up means includes a film guide 68 to receive film from the intermittent means 62 and guide it over a sound head 70, which may be mounted on a bracket 74 secured to frame 54, to a sound drum shaft 76 against which a pressure roller 78 bears under urging of a spring (not shown) with the film between them. The pressure roller 78 is shown rotatably mounted in a pressure roller arm 80 which in turn is pivotally mounted on a pressure roller shaft 82 which is secured to bracket 74. Film guide 68 may also be pivotally mounted on shaft 82 as shown. Shaft 76 extends through bearings (not shown) in frame 54 far enough to have a fly wheel 84 (see FIG. 4) secured thereto so that smooth movement of the film past sound head 70 is assured to give pleasing natural sound reproduction. The film guide 68 and arm 80 are movable from the operative position shown in FIG. 3 to an open position to permit easy removal from and insertion of film into unit 66 by counterclockwise rotation around shaft 82 by an arm 83 which may be part of the spring (not shown) which yieldingly biases the arm 80 toward the sound drum shaft 76 in the operative position.

The film for use in the mannequin is preferably held in a cassette or magazine 86 that may be made of transparent plastic to facilitate proper placement of the magazine in the mannequin against the frame 54 and over parts projecting outwardly therefrom. The cassette 86 has a side wall 88 to engage the frame 54 and a top wall 90 to be spaced from the frame 54 by wall 88. Cassette 86 is open at the bottom, i.e., at the edge of side wall 88 which goes against frame 54. The top wall 90 is cut out at 92 to permit the lamp housing 64 to extend through it, at 94 to give access to a start arm 96 and at 98 for a sprocket assembly 100 on a transfer shaft 102 mounted in a suitable bearing (not shown) in frame 54 with the other end extending far enough to receive a gear wheel 104 (See FIG. 4). Start arm 96 is operatively connected to arm 83 and is mounted as described hereinafter for movement in arcuate slot 97 in frame 54 from the operating position shown to an open position at the other end of cut out slot 94, e.g., by a part of the arm 96 projecting through cut out 94.

The cassette 86 is of the known repeating type which does not require rewinding because the continuous film is being unwound and wound at the same time during projection of the scenes and sound on the film. It is customary where automatic stop operation is desired when the film has reached the end to provide a cut out in the edge of the film which a feeder operatively connected with a microswitch detects and stops the drive means which will now be described in connection with FIG. 4. FIG. 4 shows the opposite side of frame 54 from the side seen in FIG. 3 and it is inverted, i.e., it shows the art as they would be seen when the device as illustrated in FIG. 3 is rotated downwardly around the bottom of the frame as an axis, so that the top of the frame as seen in FIG. 3 is at the bottom of FIG. 4.

Referrinng now to FIG. 4, a motor 106 is secured to frame 54 with the shaft 108 extending outwardly at one end to receive a drive pulley 110 having a groove in its periphery to receive a belt 112 that runs around a driven pulley 114 on a gear shaft 116. Shaft 116 is mounted at one end in a bearing 118 secured to frame 54 and has a worm thread 120 formed in the surface that engages the peripheral gear teeth on gear 104. The other end of shaft 116 connects to the intermittent mechanism 62, driving the shutter and claw at proper speed in synchronism with the film sprocket assembly 100 on shaft 102.

In order to provide cooling for the lamp and prevent undesired high temperatures from developing in the device a ventilator 122 is provided which includes a fan (not shown) operatively connected to the other end of motor shaft 108.

A transformer 124 and an amplifier 126 are secured to frame 54 in convenient locations, e.g. at opposite corners as shown in FIG. 4. Also within the mannequin is a speaker 128. It is shown secured to frame 54 in FIGS. 2 and 4 but it may be placed in the head, e.g., above mirror 30, instead of the torso, or it may be placed outside the mannequin in any convenient location which will support the illusion of a speaking person.

Figure 5:
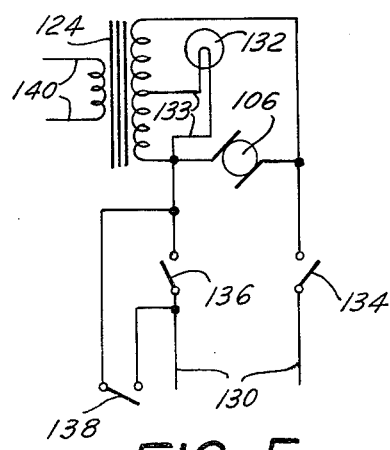
FIG. 5 is a schematic wiring diagram of the controls for the projection means.

Referring now to FIG. 5, in conjunction with FIG. 4, two electric lines 130 are provided which are to be connected, e.g., by a conventional plug (not shown) to a source of alternating current. The motor 106 and the primary of the transformer 124 are connected in parallel across lines 130. An incandescent lamp 132 is connected by wires 133 across one of the lines 130 and a tap in the transformer which will provide the voltage for which lamp 132 is designed to operate. The lamp 132 is removably secured by a suitable socket (not shown) in the lamp house 64 to generate a beam of light when voltage is impressed across its terminals.

Microswitches 134 and 136 control flow of electricity from the lines 130 to the motor 106 and transformer 124. Each is connected in series in one of the lines 130. In parallel across one of them, e.g., switch 136, is a third switch 138 that may be a remote manual switch for a visitor to close to set the sound projector in operation. The switches 134 and 136 are opened and closed by an activating arm 142 pivoted to frame 54 by means of a shaft 144. Arm 142 is in the form of a bell crank which extends between frame 54 and fly wheel 84 and is curved to miss shaft 76 as it is moved from starting to stopping position by start arm 96 which is mounted on the arcuate end part thereof that underlies the arcuate slot 97 as seen in FIG. 3 and overlies it is seen in FIG. 4. Microswitch 134 is mounted on the intermittent unit in operative connection to a lever 135 which has a part in the path of movement of an extension 146 of activating arm 142. Microswitch 136 is mounted in operative connection to a lever 148 on an insulating sheet 150 secured to frame 154. Lever 148 has a part which is also in the path of extension 146. The arrangement of the parts is such that when start arm 96 is moved from the stopped position toward the start position, activating arm 142 and extension 146 first operate microswitch 134, then will close the film gate in intermittent unit 62 and bring pressure roller 78 to engaged position against sound drum shaft 76 and finally operate microswitch 136. If remote operation of the device is desired, the start arm 96 is set so that everything except microswitch 136 is in operating position. Then when switch 138 is manually closed the operation will proceed just as if switch 136 had been closed. Lever 135 may be moved to shift switch 134 from closed to open position by a side tension pin (not shown) on the intermittent unit 62 which engages the edge of a film moving through the unit and normally keeps it in firm position in the gate. As long as the film is full width the side tension pin does not affect lever 135 and switch 134 but if the film is narrowed by cutting a slot into the edge that the side tension pin contacts it will move and release switch 134 to cut off the power from line 130.

When the start arm 96 is in stop position the entire cassette 86 can be pulled off the frame 54 and associated parts and replaced by another. In pulling the cassette off frame 54, the operative connection of transfer shaft 102 with the sprocket wheel assembly 100 on the cassette is separated. The connection between shaft 102 and the sprocket wheel assembly provides the power for rewinding the film that has passed through the intermittent unit 62 and the sound head unit 66. The cassette is provided in known way with holding means for a reel of film and with film guides (not shown) for locating the parts of the film that enter the film gate and the sound head when a cassette is placed in position against the frame 54 in proper position for easy entry and this automatically establishes a drive connection between transfer shaft 102 and the sprocket assembly 100 on the new cassette.

Reference to FIG. 5 shows that the secondary winding of transformer 124 is provided with leads 140. They are connected to amplifier unit 126 which may have any suitable construction that sufficiently amplifies the sound which the sound head 70 picks up from the sound track on the film to operate speaker 128 at a level which assures satisfactory transmission of the recorded message to a listener. Certain of the electrical connections of FIG. 5 are also shown on FIG. 4, including the connection 133 from the motor terminal and the transformer to the lamphouse 64, the connection 71 from the sound head 70 to the amplifier 126 and the connection 129 from the amplifier to the speaker 128. Other necessary wiring (not shown in detail in FIG. 4) is provided to complete the circuits shown in FIG. 5. It may be desirable to provide a control panel in some convenient location, e.g, on the back of a housing 152 around the projector and related parts constituting the torso 4 where it may be concealed by a jacket on the mannequin.

The sound and movie projector described and illustrated above is not, as such, a part of the present invention and any such projector having means that will operate in the manner described may be used in the combination of the invention. A commercially available projector that has functioned satisfactorily with minor modifications in the frame 54, omission of unnecessary parts and repositioning of the control panel, is manufactured under the trademark VIDEOTRONIC SUPER 8 by Norske Smalfilmapparater A/S of Oslo, Norway, and distributed in the U.S.A. by MPO Videotronic Projector Corp. of New York. The January 1968 Service Manual for this projector published by the manufacturer is representative of the published prior art of automatic repeater projectors with magnetic sound which comprise an element of the combination of the present invention.

The projector used in the invention is preferably one that uses 8 mm film because it can be made small enough to fit within the torso of a mannequin of about normal size. The 8mm film has a single line of sprocket holes adjacent to one edge of the film. The picture frames occupy almost all of the space between the line of sprocket holes and the distant edge of the film leaving no space for a sound track on that side but there is space for it between the line of sprocket holes and the adjacent edge of the film.

In preparing the mannequin for use to deliver a message accompanied by facial expressions related to the message the first step is to prepare the message. The second step is to select a living person having the voice quality and personal appearance appropriate for the message. This person then delivers the message while the voice is recorded and the facial expressions related to the message are photographed on film, e.g., film designed for use in a 8 mm projector. Instead of photographing the facial expressions of a living person delivering the message, any of the known techniques for obtaining photographs of facial expressions of a cartoon character may be used instead. The film is then developed and edited and the sound corresponding to the retained picture frames is applied to the film as a sound track between the line of sprocket holes and the near edge. The completed film is joined together by a splicing technique and assembled in a repeater type cassette 86. With the start arm 96 in stop or open position the cassette 86 is inserted in the projector in the mannequin whereupon start arm 96 is moved far enough toward start position to close the film gate, the sound head and at least microswitch 134. If automatic repetition of the message is desired as long as the supply line 130 is connected to a source of alternating electric current of proper voltage, the start arm would be moved on to close switch 136 as well whereas if remote control by switch 138 is desired, movement of start arm 96 is arrested when microswitch 134 has been closed. If a different message prepared in the same way is to be presented, the operator moves start arm 96 to the stop position, thereby opening the film gate and sound head unit assembly 66 to release the film for ready removal with the cassette 86, whereupon the cassette having the film containing the different message is inserted in the manner previously described.

The foregoing description is of the preferred and best presently known embodiment of the invention which comprises a combination of a plurality of elements which produce the animated speaking mannequin. The principles of the invention described are of broader application than reproduction of human voice and facial expressions and beneficial results new to the art can be obtained with less than the most comprehensive combination of parts. As an example, the face piece may be formed in the generalized shape of an animal instead of a human, in which case a mirror or the like in the head may be unnecessary. As another example, the means for adjusting the projected facial features to fit the features on the face piece is beneficial whether or not sound accompanies the visual projection. As a further example, the two part mannequin comprising the first part of head and neck adjustably connected to the second or torso part is a beneficial combination for right projection, with or without sound reproduction. As an additional example, the film does not have to be in a replaceable cassette, or of the continuous, repeating type but could be the straight through type with supply and take up reel with or without automatic rewind. Nor is it essential that 8mm film be used, or that the sound track be on the same film with the sight frames. These various combinations and subcombinations contemplated by the invention are more particularly defined in the claims.

Those skilled in the art to which this invention pertains will also recognize that variations and modifications of the structure of the parts, which have been described and illustrated in connection with the presently best known embodiments thereof, may be made without departing from the principles disclosed, and such variations and modifications are contemplated as part of the invention.

Having thus described and illustrated the invention, what is claimed is:

1. A mannequin comprising a first part forming a hollow head and neck, a second part forming a hollow torso, a three dimensional rear projection screen forming the face part of said head having well defined forehead, nose, cheeks and chin and smooth poorly defined eye and mouth areas, means inside said torso for projecting motion pictures of facial features including well defined eye and mouth parts that correspond in size at the screen to said face part from inside said torso through the hollow neck into said hollow head, means in said hollow head for reflecting said motion pictures onto said screen without correction for three dimensional effects to give the illusion of life thereto, and means for moving said head relative to said torso to locate the projection of said well defined eye and mouth parts properly on said poorly defined eye and mouth areas.

2. A mannequin as set forth in claim 1 in which said face part is a human face.

3. A mannequin as set forth in claim 2 in which said projection means includes means for reproducing sound correlated with the motion pictures.

4. A mannequin comprising a hollow head, neck and torso, said head including a face piece of coated molded transparent plastic having at least some well defined facial features including forehead, nose, cheeks and chin but smooth poorly defined eye and mouth areas, a film having picure frames of facial expressions containing at least said well defined facial features and details of eyes and mouth, means including a projector mounted in said torso for projecting said facial expressions on said film from said torso without correction for three dimensional effects onto the face piece as a rear projection screen and adjusting means for moving the head relative to the torso to correct for optical distance and cant to align the location of the projected facial features with the corresponding features on said face piece.

5. A mannequin as set forth in claim 4 in which said adjusting means comprises a plurality of adjusting screws.

6. A mannequin as set forth in claim 4 in which said projecting means includes means in said head for receiving the projected facial expressions from said torso and transmitting them to the face piece.

7. A mannequin as set forth in claim 4 in which said facial features are human.

8. A mannequin as set forth in claim 4 in which said film includes a sound track having a record of sounds related to the facial expressions and means for reproducing said record as audible sounds in synchronism with the projection of said facial expressions.

9. A mannequin comprising a hollow head, neck and torso, said head including a face piece of coated molded transparent plastic having a well defined forehead, nose, cheeks and chin but smooth poorly defined eye and mouth areas, a film having a sound track containing a message and picture frames of facial expression including eye and mouth details related to said message, means in said torso for projecting said facial expressions from said film without correction for three dimensional effects through the neck into the head, means in the head for receiving the projected facial expressions and transmitting them to the face piece, adjusting means in said mannequin to correct for optical distance from said film to said face piece and for cant to position the projection of said well defined eye and mouth details properly on said smooth poorly defined eye and mouth areas, means in said torso for picking up the message from said sound track, and means for reproducing as audible sound the message picked up.

10. A mannequin as set foth in claim 9 in which said adjusting means includes screw means mounting said heat on said torso.

11. An animated speaking mannequin comprising a hollow head, neck and torso, the head including a human face piece of coated molded transparent plastic having well defined forehead, cheeks, chin and nose but smooth poorly defined eye and mouth areas forming a rear projecting screen, means for projecting a moving picture of the face of a speaking person including well defined eye and mouth details in a beam of light without correction for three dimensional effects through said neck, means mounted in said head to transmit the beam of light to the rear surface of said face piece, means on said mannequin between said face piece and said projecting means for adjusting the location of the projected eye and mouth details in said transmitted beam of light properly on the mouth poorly defined eye and mouth areas of said face piece, and means for producing audible sound corresponding to the speech of said face.

12. An animated speaking mannequin as set forth in claim 11 in which said light transmitting means is a mirror.

13. An animated speaking mannequin as set forth in claim 11 in which said head and neck are made as a first part, the torso as a second part and they are connected together by adjustable means for properly locating the projected face on said face piece.

14. An animated speaking mannequin as set forth in claim 11 in which said projecting means comprises a film that is endless and in a replaceable cassette.

15. An animated speaking mannequin as set forth in claim 14 having a remote switch for turning on the projecting means.

16. An animated speaking mannequin as set forth in claim 15 in which said film includes a sound track which contains a message and said projecting means has automatic means to stop it when the message has been delivered.

17. A mannequin comprising a head part and a torson part, said head part including a rear projection screen shaped as a face with well defined forehead, cheeks, nose and chin but smooth areas for eye and mouth without details, means for projecting a light beam containing motion pictures of a face having eye and mouth details from said torso part onto said face, and adjusting means connecting said head part to said torso part for properly locating the projected eye and mouth details on said smooth eye and mouth areas.

* * * * *

UNITED STATES PATENT OFFICE
CERTIFICATE OF CORRECTION

Patent No. 3,973,840          Dated August 10, 1976

Inventor(s) G. Richard Jacobs et al.

It is certified that error appears in the above-identified patent and that said Letters Patent are hereby corrected as shown below:

Column 1, line 59, "Fig. 2" should read --- Fig. 1 ---.

Column 4, line 43, "art" should read --- parts ---.

Signed and Sealed this

Ninth Day of November 1976

[SEAL]

Attest:

RUTH C. MASON
Attesting Officer

C. MARSHALL DANN
Commissioner of Patents and Trademarks